United States Patent
Sauler et al.

(10) Patent No.: US 6,588,401 B2
(45) Date of Patent: Jul. 8, 2003

(54) METHOD FOR KNOCK CONTROL

(75) Inventors: Jürgen Sauler, Stuttgart (DE); Oskar Torno, Schwieberdingen (DE); Axel Heinstein, Wimsheim (DE); Rolf Petzendorfer, Markgroeningen (DE); Carsten Kluth, Stuttgart (DE); Werner Haeming, Neudenau (DE); Anton Kantschar, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/967,193

(22) Filed: Sep. 28, 2001

(65) Prior Publication Data

US 2002/0073766 A1 Jun. 20, 2002

(30) Foreign Application Priority Data

Sep. 28, 2000 (DE) .......................... 100 48 060

(51) Int. Cl.⁷ .................................. F02P 5/00
(52) U.S. Cl. ............... 123/406.21; 123/406.36
(58) Field of Search .................. 123/435, 406.21, 123/406.36, 406.37, 406.38, 406.39, 406.4

(56) References Cited

U.S. PATENT DOCUMENTS

| | | | | |
|---|---|---|---|---|
| 4,527,525 A | * | 7/1985 | Mauermann et al. | .. 123/406.37 |
| 5,038,735 A | * | 8/1991 | Hosoya et al. | ......... 123/406.21 |
| 5,090,382 A | * | 2/1992 | Bolander et al. | ...... 123/406.33 |
| 5,144,929 A | * | 9/1992 | Hosoya et al. | ......... 123/406.21 |
| 6,009,111 A | * | 12/1999 | Corwin et al. | ................. 372/32 |
| 6,360,586 B1 | * | 3/2002 | Morishita et al. | .......... 73/35.08 |
| 6,407,610 B2 | * | 6/2002 | Mazzucco et al. | .......... 327/336 |

* cited by examiner

Primary Examiner—John Kwon
(74) Attorney, Agent, or Firm—Kenyon & Kenyon

(57) ABSTRACT

A method for knock control during KC emergency operation with which, given low application expenditure, a torque gain can be attained, while the application reliability increases. The method for knock control of multi-cylinder internal combustion engines having $2n$ cylinders, a cylinder counter, at least one knock sensor and an evaluation unit for evaluating the knock-sensor signal with the aid of an individual knock-recognition characteristic for each cylinder, is characterized in that during KC emergency operation, cylinder pairs are formed from the cylinders operating offset in each case by 360°, and the minimal value of the two knock-recognition characteristics of the cylinder pair is assumed in each case as the knock-recognition threshold for the cylinders of the cylinder pair affected by the malfunction of the phase recognition.

3 Claims, 1 Drawing Sheet

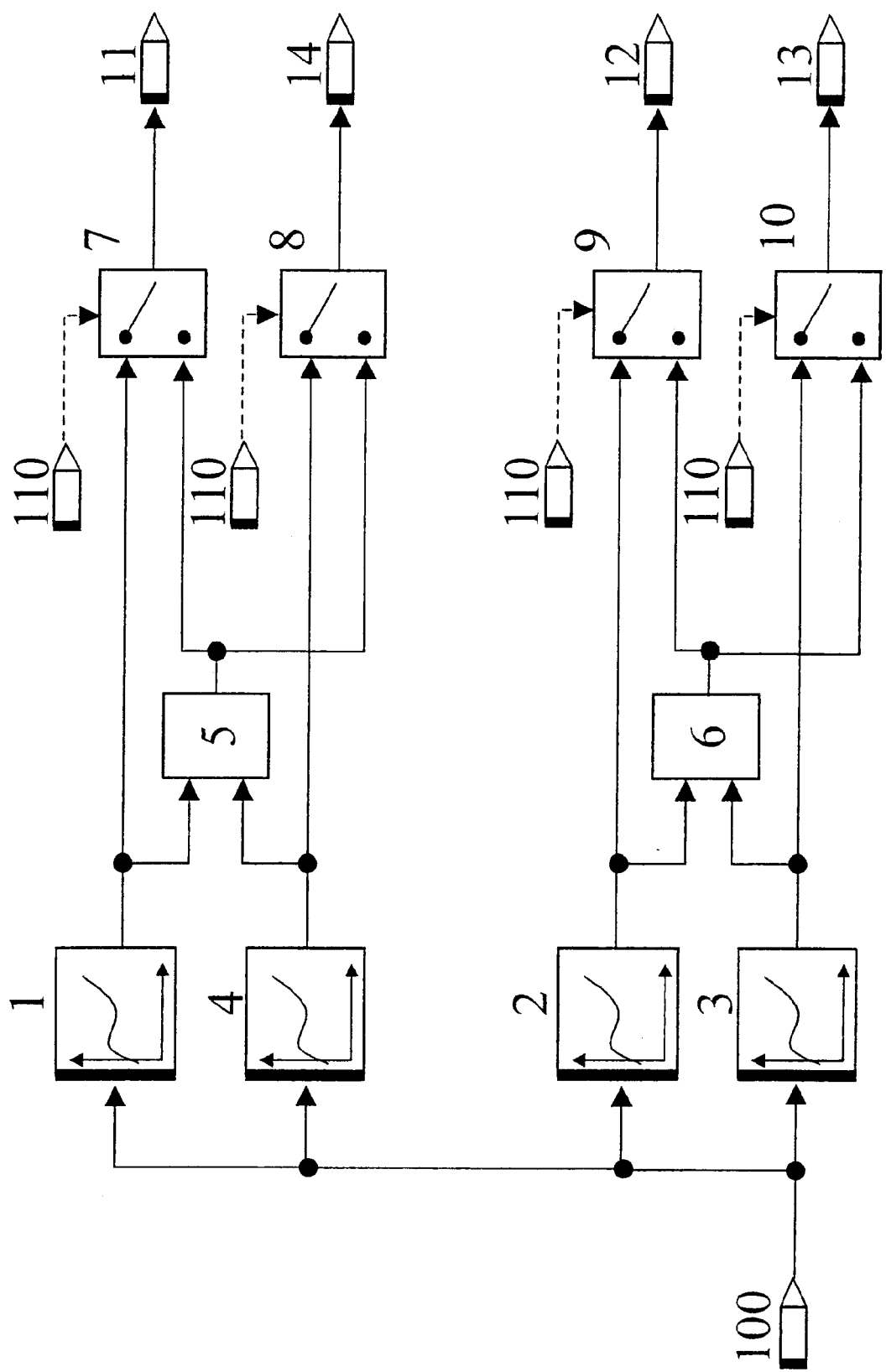

METHOD FOR KNOCK CONTROL

FIELD OF THE INVENTION

The present invention relates to a method for knock control of multi-cylinder internal combustion engines having 2n cylinders, a cylinder counter, at least one knock sensor and an evaluation unit for evaluating the knock-sensor signal with the aid of individual knock-recognition characteristic for each cylinder.

BACKGROUND INFORMATION

Understood by knocking is an uncontrolled form of combustion which can lead to engine damage. For this reason, as a rule the ignition angle is always selected with a safety margin to the knock limit. On the other hand, it is known that an internal combustion engine should be operated as close as possible to the knock limit in order to attain optimum torque. Thus, the observance of a safety margin of the ignition angle to the knock limit is associated with an increased fuel consumption. The knock limit is dependent on various factors during the operation of an internal combustion engine, such as the fuel quality, the engine state and the environmental conditions. To permit selection of the safety margin that is as small as possible, thus to be able to set the ignition angle as close as possible to the instantaneous knock limit, it is necessary in each case to first of all determine the instantaneous knock limit. In so doing, knock sensors such as structure-borne noise sensors or combustion chamber pressure censors are used in practice.

The knock-sensor signal is evaluated for each cylinder individually. The allocation of the instantaneous knock-sensor signal to a specific cylinder necessary for this purpose is carried out with the aid of a cylinder counter within the context of a phase recognition, in which the states of the individual cylinders are detected during the operation of the internal combustion engine. Under certain circumstances, in the event the phase recognition malfunctions, it can no longer be determined whether the knock-sensor signal being evaluated is to be allocated to the cylinder corresponding to the cylinder counter reading or to the cylinder operating offset by 360°. This case is known as knock control (KC) emergency operation.

In practice, during KC emergency operation, the knock-recognition threshold rated the most sensitive of all cylinders of the internal combustion engine is selected and taken as a basis for the ignition-angle control of all cylinders. The selection of the corresponding knock-recognition characteristic is then checked upon each change of the knock-recognition thresholds in order to avoid unrecognized knocking, and with that, engine damage.

SUMMARY OF THE INVENTION

The present invention provides a method for knock control during KC emergency operation with which, given low application expenditure, a torque gain can be attained, while the application reliability increases.

This is achieved according to the present invention in that, during KC emergency operation, cylinder pairs are formed from the cylinders operating offset by in each case 360°, and the minimal value of the two knock-recognition characteristics of the cylinder pair is assumed in each instance as the knock-recognition threshold for the cylinders of the cylinder pair affected by the malfunction of the phase recognition.

Thus, according to the present invention, the ignition angle is controlled individually for each cylinder even during KC emergency operation. In comparison to the use of one knock-control characteristic for all cylinders, the formation of cylinder pairs according to the present invention permits more advanced ignition angles for at least a part of the cylinders of the internal combustion engine, so that a torque gain can be attained.

In one advantageous variant of the method according to the present invention, the minimal value of the two knock-recognition characteristics is ascertained individually for each data point of these characteristics, and not for the complete characteristics. This can decisively reduce the application expenditure.

Furthermore, it is advantageous—in view of the application reliability, as well—if the minimal value of the two knock-recognition characteristics is selected automatically during the readout of the knock-recognition thresholds.

BRIEF DESCRIPTION OF THE DRAWING

The single FIGURE shows a circuitry logic for implementing the method of the present invention for a 4-cylinder engine having a knock sensor. Cylinders 1 through 4, as well as the knock sensor, are not shown here.

DETAILED DESCRIPTION

An input at which the instantaneous engine speed is applied is designated by 100. With the aid of the instantaneous engine speed and four individual knock-recognition characteristics 1 for cylinder 1, 4 for cylinder 4, 2 for cylinder 2 and 3 for cylinder 3, the instantaneous knock-recognition threshold for the instantaneous speed can be determined for each cylinder of the 4-cylinder engine. For that purpose, values for the knock-recognition threshold are ascertained from the characteristic curves as a function of the speed. According to the present invention, cylinder 1 and cylinder 4, as well as cylinder 2 and cylinder 3, in each case operating offset by 360°, are combined to form cylinder pairs, in that at 5 and 6, in addition to the individual knock-recognition thresholds, the minimum of the knock-recognition thresholds per cylinder pair is always determined, as well. In the event that the condition for KC emergency operation 110 is applied at switches 7 through 10 downstream of 5 and 6, the minimum of the knock-recognition thresholds per cylinder pair is determined as the instantaneous knock-recognition threshold 11 for cylinder 1, 14 for cylinder 4, 12 for cylinder 2 and 13 for cylinder 3, instead of the knock-recognition threshold ascertained on the basis of individual knock-recognition characteristics 1, 4, 2 and 3.

The knock recognition in the case of the two inner cylinders 2 and 3 is more often than not better than for the two external cylinders 1 and 4, so that the knock-recognition thresholds of cylinders 2 and 3 are also greater according to tendency than those of cylinders 1 and 4. This can be attributed to the shorter transmission distance of the structure-borne noise to the knock sensor, and a greater signal-to-interference ratio caused thereby. Since according to the present invention, cylinders 2 and 3, as well as cylinders 1 and 4 in each case form cylinder pairs, in the event of KC emergency operation, the knock-recognition thresholds of cylinders 2 and 3 are not so sharply lowered as the knock-recognition thresholds of cylinder 1 and cylinder 4. Unnecessary fault detections, and as a result, unjustified ignition retard of the ignition angle is thereby avoided.

What is claimed is:

1. A method for performing a knock control of a multi-cylinder internal combustion engine including 2n cylinders, a cylinder counter, at least one knock sensor, and an evaluation unit for evaluating a knock-sensor signal with the aid of an individual knock-recognition characteristic for each cylinder, the method comprising the steps of:

if a phase recognition malfunction occurs, forming a cylinder pair from those of the 2n cylinders operating offset by in each case 360°; and if the phase recognition malfunction occurs, assuming a minimal value of two knock-recognition characteristics of the cylinder pair as a knock-recognition threshold for the cylinders of the cylinder pair affected by the phase recognition malfunction, wherein:

the phase recognition malfunction occurs if the evaluation unit cannot detect whether the knock-sensor signal is to be allocated to the cylinder corresponding to the cylinder counter reading or to the cylinder operating offset by 360°.

2. The method according to claim 1, further comprising the step of:

ascertaining the minimal value of the two knock-recognition characteristics individually for each data point of the two knock-recognition characteristics.

3. The method according to claim 1, further comprising the step of:

automatically selecting the minimal value of the two knock-recognition characteristics during a readout of the knock-recognition threshold.

\* \* \* \* \*